United States Patent [19]

Parkes

[11] Patent Number: 4,599,809
[45] Date of Patent: Jul. 15, 1986

[54] GRAIN DRYER SYSTEM

[75] Inventor: Donald H. Parkes, Lamoni, Iowa

[73] Assignee: Shivvers, Incorporated, Corydon, Iowa

[21] Appl. No.: 650,677

[22] Filed: Sep. 13, 1984

[51] Int. Cl.$^4$ .............................................. F26B 21/10
[52] U.S. Cl. .......................................... 34/31; 34/48; 34/56; 34/89
[58] Field of Search ........................ 73/864.33, 863.81; 406/109; 34/46, 48, 54, 89, 233, 56, 30, 34, 33, 31

[56] References Cited

U.S. PATENT DOCUMENTS

| | | | |
|---|---|---|---|
| 2,855,697 | 10/1958 | Barre | 34/46 |
| 3,580,084 | 5/1971 | Kramer | 73/864.33 |
| 3,636,638 | 1/1972 | Noyes . | |
| 3,714,718 | 2/1973 | Sukup . | |
| 3,714,818 | 2/1973 | Relph . | |
| 3,736,667 | 6/1973 | McClaren . | |
| 3,743,930 | 7/1973 | Fathauer . | |
| 3,761,810 | 9/1973 | Fathauer . | |
| 3,765,547 | 10/1973 | Shivvers . | |
| 3,765,548 | 10/1973 | Shivvers . | |
| 3,794,911 | 2/1974 | Fathauer . | |
| 3,861,054 | 1/1975 | Stahl | 34/48 |
| 3,946,496 | 3/1976 | Sukup . | |
| 4,004,351 | 1/1977 | Sanneman et al. . | |
| 4,152,840 | 5/1979 | Stille . | |
| 4,217,701 | 8/1980 | Mathews . | |

OTHER PUBLICATIONS

ASAE Paper No. 80-5522 (Singleton et al.), dated 12-2-80.
ASAE Paper No. 82-3009 (Wafler et al.), dated 6-27-82.
ASAE Paper No. 82-6006 (Borsum et al.), dated 6-27-82.
ASAE Paper No. 83-3031 (Smith et al.), dated 6-26-83.
Master Degree Thesis 1317695 (Borsum) dated 1981.
Brochure—Insto Moisture Tester; Insto, Inc., dated Aug., 1977.
Brochure—Moisture Monitors; Dickey–John Corp.
Brochure—Control Systems; Dickey–John Corp.
Brochure—Moisture Tester; Dickey–John Corp.

*Primary Examiner*—Larry I. Schwartz
*Attorney, Agent, or Firm*—Litman, Day and McMahon

[57] ABSTRACT

A computer controlled grain dryer system includes a grain drying bin, a solenoid valved burner, a blower, and an arrangement of grain unloading augers. An air temperature sensor for the drying airflow provides a temperature signal. A grain moisture sampling system receives a grain sample from the grain unloaders and conveys the sample to a capacitive sample cell. A grain moisture meter senses grain moisture content as a function of the dielectric constant of the sample in the cell. A digital computer is interfaced with the temperature sensors, the moisture meter, the burner valves, the blower, and the auger motors and is programmed to automatically control the grain sampling and the drying process according to a set temperature limit and moisture content for the particular grain to be processed.

30 Claims, 6 Drawing Figures

GRAIN DRYER SYSTEM

FIELD OF THE INVENTION

The present invention relates to grain dryer systems and, more particularly, to a computer controlled grain dryer system which operates in response to the measured moisture content of the grain to be dried.

BACKGROUND OF THE INVENTION

The moisture content of freshly harvested grain is too high for storage right away. The moisture content must be lowered before storage to prevent spoilage. For corn, a moisture content of 17 to 18 percent is considered the maximum desirable moisture content for short term storage. A moisture content of 15.5 percent is considered optimum by commercial grain elevator operators. For long term storage of the grain, 14 percent is preferred to retard spoilage. The removal of too much moisture is wasteful of drying energy and usually results in shrinkage which decreases the sale value of the grain. If the moisture is removed too rapidly, damage to the grain results.

There are a number of types of grain dryers in current use of which two major types are the continuous flow type and the batch dryer type. In a continuous flow grain dryer, grain is processed substantially continuously. Generally, large volumes of air at relatively high temperatures are passed through grain in a drying chamber. However, heat damage to the grain is minimized by the short stay of the grain in the chamber. Continuous flow dryers are classed as concurrent flow, cross flow, or counter flow dryers depending on the relationship of the directions of grain flow and air flow through the drying chamber. Continuous flow grain drying is capable of high rates of grain processing; however, the energy efficiency of such drying in most cases is not optimum because the drying air does not become saturated with moisture from the grain because of the high flow rate of the drying air. Most commercial grain drying operations employ continuous flow systems. In addition, a fair number of individual farmers use continuous flow types of dryers.

In batch grain dryers, as the name suggests, a quantity of grain is loaded into a chamber, usually a drying bin; and heated air is passed through the grain until it is dryed. In general, it is necessary to remove dried grain in the lower layer of the bin or recirculate it to the top of the bin to prevent overdrying of the lower layer. Batch type grain drying is capable of high energy efficiency because the drying air is usually saturated with moisture from the grain before leaving the bin. However, the grain processing rates achievable in batch dryers is lower than in continuous flow dryers such that, currently, batch type drying is usually restricted to smaller operations.

In most types of grain drying methods of the past, constant attention of operators was required for sampling moisture content, monitoring of temperature sensors, control of grain flow rates, and the like. Attempts have been made in the recent past to automate grain drying operations. Attempts at controlling grain drying operations through classic automatic control methods have met with varying success for a number of reasons including the diversity of types of grain drying equipment, varying environmental conditions in which such equipment is operated, difficulties in accurately characterizing the operation of grain drying, and other factors.

In the more recent past, attempts have been made to apply digital computers to the task of controlling grain drying operations. The number of variable factors which was a problem in the classic control approach continues to be a problem in the approach employed by the majority of computer controlled drying systems. This appears to be particularly true for systems in which the grain moisture content is determined indirectly by temperature measurements. The placement of temperature sensors in such systems for meanful temperature measurements and the isolation of such sensors from environmental variables has also been a problem. For example, the placement of temperature sensors in grain unloading auger tubes has caused problems because of clogging of the tubes and damage to the sensors caused by the abrasive action of the grain passing through the tube.

Generally, moisture measurements made by measuring the dielectric constant of a grain sample in a capacitive moisture meter cell are simpler than moisture measurements based on grain or air temperatures. However, one problem with such cells as configured in the past has been that a precise volume or weight of grain is required for accurate measurements. For this reason, such capacitive moisture meters have tended to require manual loading of the grain sample in combination with complex sample size compensation techniques. For these reasons, it has generally been felt that the automatic control of grain drying operations based on capacitive moisture content measurement is not workable.

SUMMARY OF THE INVENTION

The present invention provides an automatic control arrangement for grain drying based on capacitive moisture content measurement. The drying equipment includes a bin having a grain chamber separated from a heated air distribution plenum by a perforated floor. A center vertical auger in combination with a sweep auger at the bottom of the grain chamber are employed for unloading the dried grain. A plenum air temperature sensor provides a drying air temperature signal for optimizing the drying operation. A grain sampling subsystem for moisture content measurements includes a conduit from the unloading auger to a capacitive sample cell. The grain may either be fed to the sample cell by gravity or more positively by pneumatic means. The grain sample cell is configured such that it is always overfilled for measurements such that precise measuring of sample sizes is not required. The temperature sensor, capacitive moisture meter, auger motors, burner valves, and heater blower fans are all interfaced to a digital computer. A starting air temperature and a maximum temperature limit are entered into the computer along with the desired moisture content. The computer is programmed to operate the drying system to dry the grain within the set parameters, to monitor the system for malfunctions, to respond to such problems as by correcting the problem if possible or by shutting the system down and sounding an alarm, and to print out reports of the operation. The system is capable of reliable operation without the attention of an operator and is characterized by a high output and high quality of the processed grain.

OBJECTS OF THE INVENTION

The principal objects of the present invention are: to provide an improved grain drying system; to provide such a system which results in a superior grain product which has a high uniformity of the desired moisture content; to provide a grain dryer control system which controls the grain drying equipment in response to the measured grain moisture content and unloads the grain when the moisture content reaches a desired level; to provide such a system wherein a startup drying air temperature and a maximum air temperature and the desired grain moisture content are set by an operator and are monitored by the control system to optimize the drying operation; to provide such a system which automatically loads a moisture meter sample cell and measures the moisture content as a function of the dielectric constant of the grain; to provide an embodiment of such a system which returns the moisture meter grain sample to the drying chamber; to provide such a system which prints a record of the grain drying operation; to provide such a system which monitors various parameters of the grain drying system and which controls the process in response to such parameters; to provide such a system which will function reliably without human intervention; to provide such a system which includes a digital computer; to provide such a control system which averages the moisture content readings and which adjusts the temperature of the drying air in response to the relationship of each individual reading to the current average to expedite the processing of grain through the drying system; to provide such a control system which is adaptable to many types of existing grain drying systems; and to provide such a grain drying system which is economical to manufacture, reliable and energy efficient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
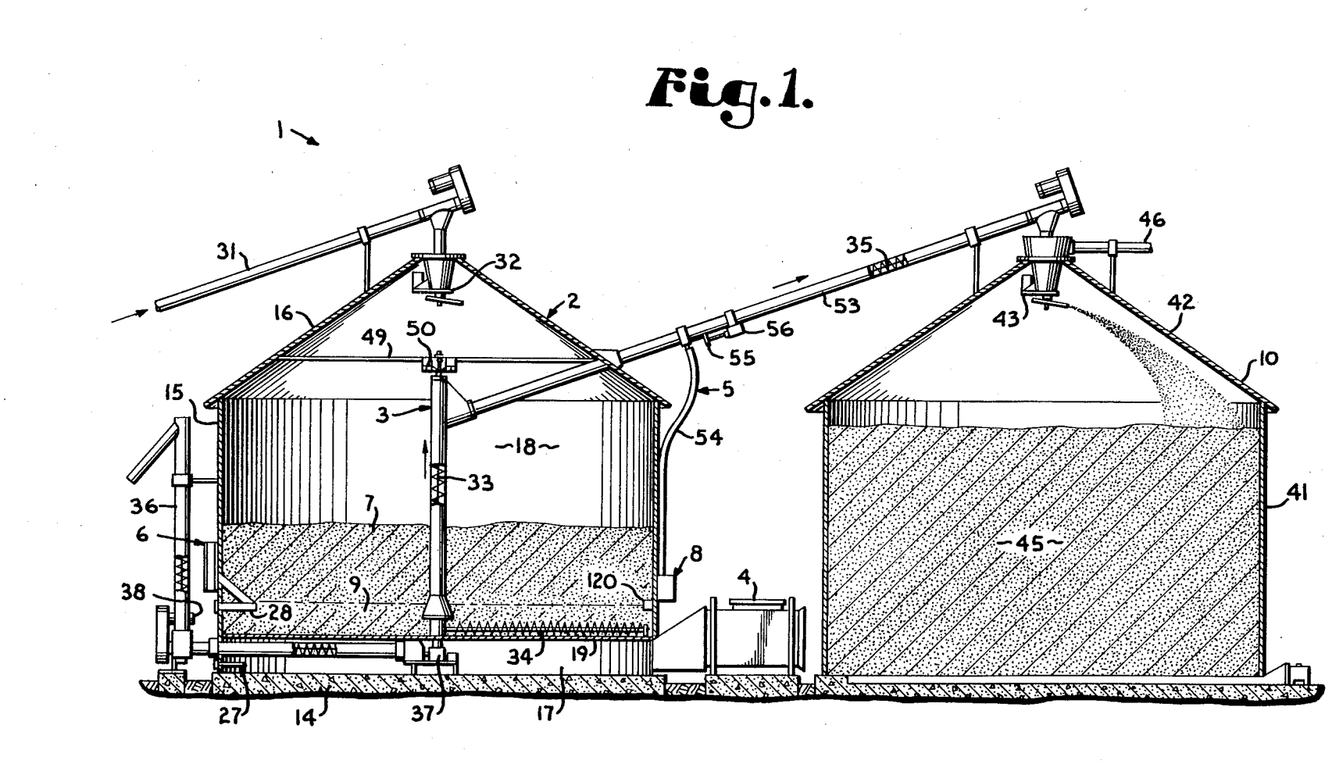
FIG. 1 is a sectional view of a pair of grain bins in which the grain drying system according to the present invention is installed.
Figures 2, 3, 4:
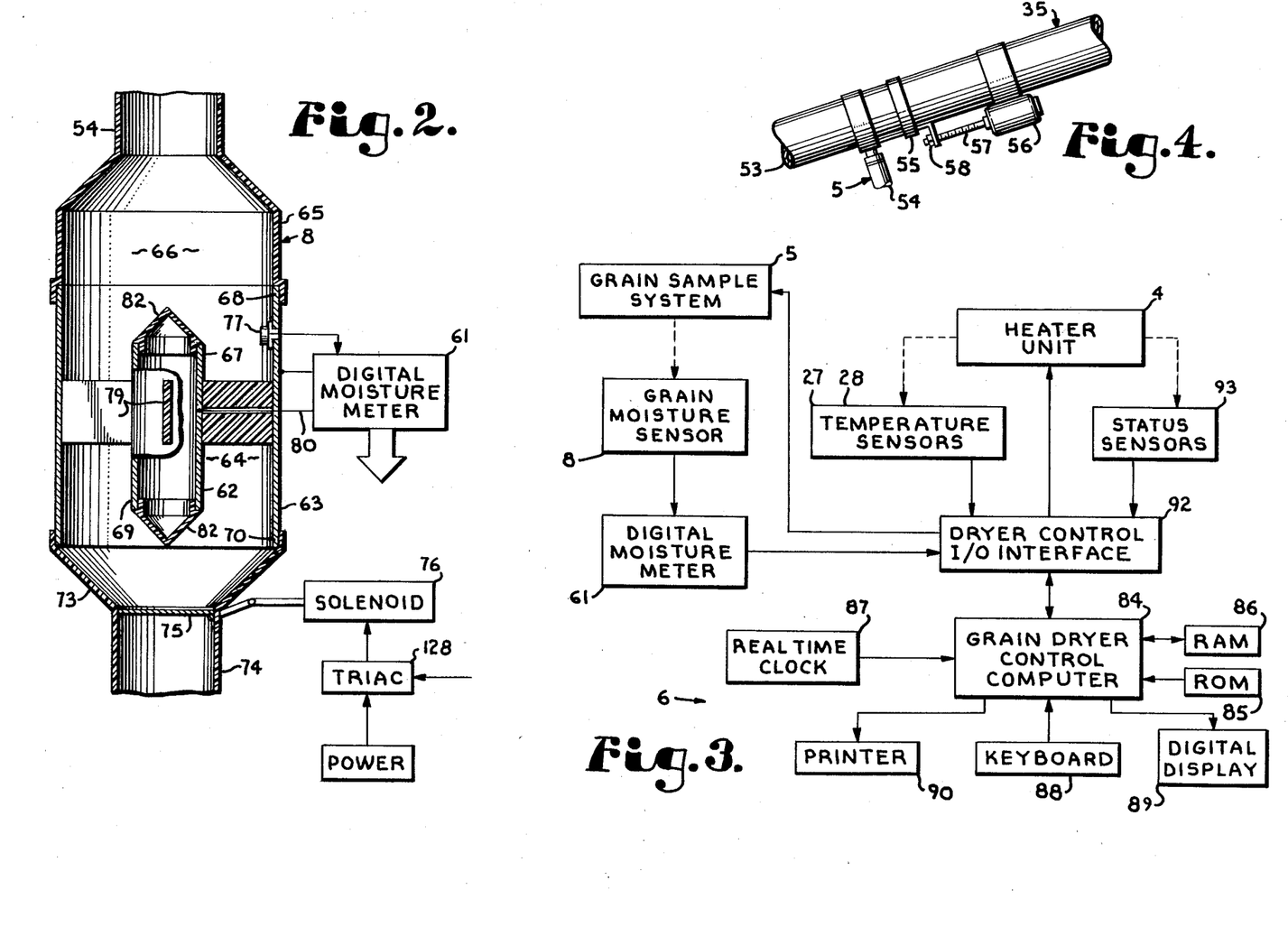
FIG. 2 is a diagramatic sectional view of a moisture meter sample cell according to the present invention.
FIG. 3 is a simplified block diagram of the control system according to the present invention.
FIG. 4 is a side elevational view of a motorized slide gate for gravity feeding grain to the moisture meter sample cell according to the present invention.

Referring to the drawings in more detail:

The reference numeral 1 generally designates a computer controlled grain drying system according to the present invention. The exemplary grain dryer system 1 generally includes a grain drying bin 2, grain conveying means such as bin unloading augers 3, an air heater and blower unit 4, a grain moisture meter sampling system 5, and a grain dryer controller or control computer 6 (FIG. 3). A quantity of wet grain 7 is loaded into the bin 2, and heated air from the unit 4 is passed through the wet grain to dry same. Periodically, the grain is withdrawn from the unloader augers 3 for loading into a sample cell or chamber 8 of the grain sample system 5. The moisture content of the sample is measured; and in response to the measured moisture content, either the drying process is continued or the lower layer or drying zone 9 of the grain in the bin 2 is transferred out of the bin 2 and into, for example, a grain storage bin 10.

The grain dryer bin 2 is a conventional type of grain bin including a base 14, as of concrete, an upstanding cylindrical wall 15, and a frusto-conical roof 16. Although not illustrated, the wall 15 is preferably of a double wall construction for insulation purposes. Internally, the bin 2 has a lower air distribution plenum 17 and an upper grain drying chamber 18. The plenum 17 is separated from the chamber 18 by a perforated floor 19 which supports the grain 7 within the chamber 18. The walls 15, roof 16, and floor 19 are constructed of sheet metal, the outer wall 15, at least, being preferably corrugated for strength.

Figure 5:
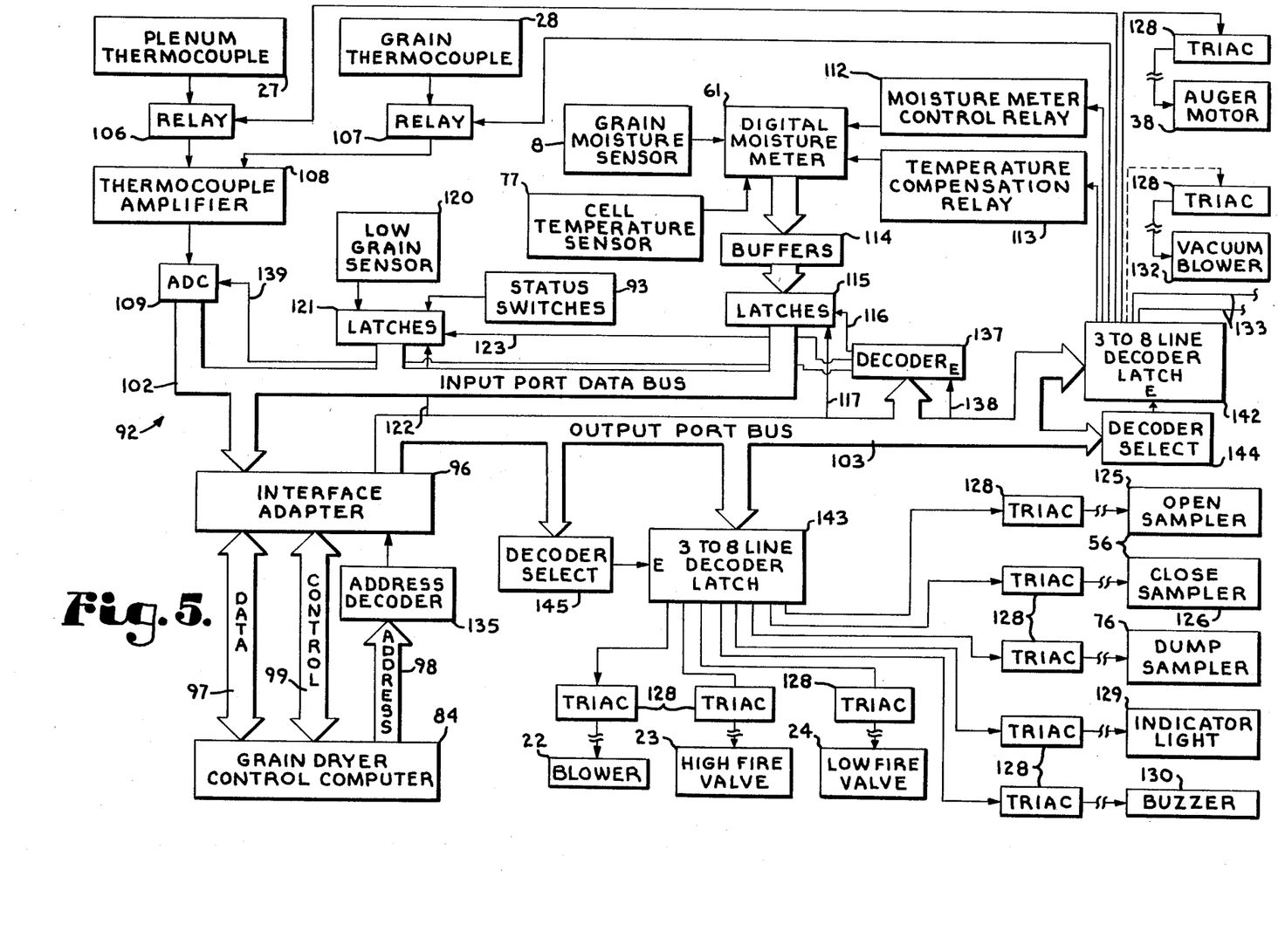
FIG. 5 is a block diagram illustrating the principal computer interface of the control system.

The heater-blower unit 4 communicates with the plenum 17. The unit 4 is conventional and includes a fuel burner which cooperates with a fan or blower 22 (FIG. 5) to heat air. The heater unit includes fuel valves to control the flow of fuel such as natural gas or the like to the burner; and the illustrated unit 4 includes a high fire valve 23 and a low fire valve 24 (FIG. 5). Other types of valving arrangements such as modulating, proportioning, throttling valves, or the like could also be employed. The unit 4 is operative to heat air which is propelled by the blower 22 into the plenum 17. The heated air expands upon entry into the plenum 17 and is forced into the grain chamber 18 by the blower 22. The drying action occures in the drying zone or lower layer of grain 9 with the upper levels receiving virtually no drying action because of saturation of the air with moisture from grain in the drying zone 9. In order to monitor the drying process, the plenum 17 is provided with a plenum air temperature sensor 27, and the chamber 18 may be provided with a grain temperature sensor 28 which is located to sense the temperature of the lower layer of grain 9. A grain temperature sensor would be desirable in a rice dryer because of the greater sensitivity of rice than other grains to damage from overheating. The blower 22 may be capable of operating independently of the burner portion of the unit 4 such that the temperature of the grain within the bin 2 can be controlled by heating to the maximum desired temperature and, if necessary, operating the blower 22 to cool the grain. Such action is desirable when drying a final load of grain which will remain in the bin 2 to prevent spoilage of the grain which would be accelerated because of the elevated temperature.

The grain drying bin 2 is loaded with grain by the grain conveyor means including, specifically, a bin loading auger 31 mounted on the roof 16 of the bin 2. The auger 31 transfers the incoming grain to a rotary grain spreader unit 32 positioned on the inside of the apex of the conical roof 16 for even distribution of the grain about the grain chamber 18. Grain is unloaded from the bin 2 by the unloading augers 3 which include a center vertical auger 33, a sweep auger 34, and a distribution auger 35 which propels the dried grain to storage bins such as the bin 10. The bin 2 may include an auxiliary unloading auger 36 for unloading the grain directly into trucks or the like. The illustrated augers 33, 34, and 36 are all interconnected by a gearbox 37 such that these augers can be driven by a single motor 38.

The grain storage bin 10 is constructed in a manner generally similar to the dryer bin 2. The illustrated storage bin 10 includes a cylindrical wall 41, a conical roof 42, and a rotary grain spreader 43. The spreader 43 communicates with the distribution auger 35 to receive dried grain 45 from the bin 2. Preferably, the auger 35 connects with additional distribution augers 46 for distribution of the dried grain from the bin 2 to other storage bins (not shown). An arrangement of valves or gates (not shown) at the connection of the distribution augers and grain spreaders allows the selection of the particular storage bin to which the dried grain will be sent.

The sweep auger 34 is positioned horizontally near the floor 19 of the bin 2 and radial to the vertical auger 33. The sweep auger 34 is rotated about its helical axis and is revolved about the axis of the auger 33 to thereby "sweep" the lower layer of grain 9 from the floor and toward the vertical auger 33. The vertical auger 35 is supported in part by the casing of the gearbox 37 and additionally by a chain spider 49 attached to the roof 16. The auger 33 may include a recirculation spreader 50 located at its top end for use in a recirculation drying mode.

The grain sampling system 5 illustrated in FIGS. 1 and 4 communicates with the enclosing tube 53 of the distribution auger 35. A grain sample conduit 54 extends between the tube 53 and the sample cell 8. A motorized sample valve 55 may be opened or closed to allow grain to feed by gravity from the tube 53 to the cell 8. The illustrated valve 55 is actuated by a rotary electric motor 56 having a threaded shaft 57 engaging a nut 58 fixed to the valve 55. The motor 56 is supported on the auger tube 53 and is interfaced with the control computer 6 to provide for automatic grain sampling. The sampling arrangement shown in FIGS. 1 and 4 is exemplary, and other automatic sampling arrangements may be employed without departing from the spirit of the present invention.

FIG. 2 illustrates an embodiment of the moisture meter sample cell 8 of the present invention. In general, the cell 8 is a cylindrical capacitor to which is connected a capacitive digital moisture meter 61 of conventional design. The cell 8 includes an inner conductive cylindrical electrode 62 positioned coaxially within an outer conductive cylindrical electrode 63, thereby defining an annular active region 64 of the cell 8. The capacitance of the cell 8, as measured by the meter 61, is varied by the dielectric constant of any material which is present in the active region 64 of the cell 8. The amount of moisture in a sample of grain determines, for the most part, the dielectric constant of the grain sample, whereby the moisture meter 61 is operative to relate the moisture content of a sample of grain to the capacitance of the cell 8 with the sample therein. A digital moisture meter circuit which is particularly well adapted for use in the grain dryer system 1 is disclosed in U.S. Pat. No. 3,794,911.

The sample cell 8 is constructed to avoid the necessity of providing precise volumes or weights of grain samples, which arises because of electric field fringe effects which occur at the ends of the electrodes of sample cells normally used with meters such as the moisture meter 61. These effects would cause inaccurate moisture readings in sample cells sometimes heretofore employed unless precise volumes of grain were loaded into the cell. In the sample cell 8 of the system 1, a nonconductive cylindrical wall 65 extends above the outer electrode 63 such that an inactive region 66 of the cell 8 is defined thereby which extends well above the fringe region at the upper ends 67 and 68 respectively of the inner and outer electrodes 62 and 63. At the lower ends 69 and 70 of the electrodes 62 and 63, a nonconductive funnel 73 connects with a dump conduit 74 which may, for example, empty into a barrel or other container (not shown). The nonconductive material of the funnel 73 combined with the fact that the lower end of the cell is always filled during a moisture reading substantially removes any concern with consistencies within the lower fringe region at the lower end of the cell 8. The upper nonconductive wall 65 connects with the sample conduit 54. A sample cell dump valve 75 is positioned between the funnel 73 and the dump conduit 74 and is actuated by a dump valve solenoid 76. When the cell 8 is filled for a moisture measurement, the cell 8 is filled well above the inactive region 66 and below the fringe region at the lower end of the cell, whereby no fringe region inconsistencies occur from sample to sample. A sample cell temperature sensor 77, such as a thermistor, is positioned within the cell 8 to measure the temperature of the grain sample for compensation of the measured dielectric constant which is affected by the temperature of the grain samples.

The inner electrode 62 is mounted within the outer electrode 63 by means such as nonconductive vanes 79 which extend therebetween. An electrical conductor 80 which connects the inner electrode 62 to the moisture meter 61 may be routed through one of the vanes 79. The inner electrode 62 is preferably provided with means such as a conical caps 82 at the ends 67 and 69 thereof to prevent the accumulation of grain within the inner electrode. The caps 82 are of a nonconductive material. The nonconductive materials of which portions of the sample cell 8 are constructed may be plastic or any other suitable nonconductive material.

FIG. 3 illustrates the major components of the control system 6 of the grain dryer system 1. The principal control component is a digital computer or central processing (CPU) board 84. The CPU 84 may employ any of a number of suitable microprocessors which are commercially available. The preferred embodiment of the CPU 84 is based on the 6502 microprocessor of MOS Technology, Inc. The CPU 84 executes a program stored in a read only memory (ROM) 85 and stores temporary data in a read/write memory (RAM) 86. A real time clock 87 provides time of day data in relation to the operation of the system 1. A keyboard 88 allows the setting of system operation parameters, while a digital display 89 provides diagnostic information to an operator. Hard copies of system operation information are provided by a printer 90. The operating equipment of the system 1 is interfaced to the CPU 84 by an input-/output (I/O) interface unit or board 92. In general, the I/O unit 92 has the moisture meter 61, the temperature sensors 27 and 28, and other status sensors 93 connected thereto as inputs. The I/O unit outputs commands to the heater unit 4, the various augers, and other equipment of the system 1 as will be detailed hereinbelow.

FIG. 5 illustrates details of the interface unit 92, the sensors monitored by the computer 84, and the equipment controlled thereby. The operating equipment of the system 1 is interfaced to the computer 84 through an interface adapter 96 which is connected to the data bus 97, the address bus 98, and the control bus 99 of the CPU 84. The interface adapter 96 may be any one of a number of commercially available parallel interface adapter devices. The illustrated interface adapter 96 is a 6522 interface device manufactured by MOS Technology, Inc. and which is known as a Versatile Interface Adapter (VIA). The illustrated adapter unit 96 includes sixteen data lines which can be configured through programming, either individually or in groups, as input or output data lines. As employed in the system 1, one eight line group is configured as an input port and has an eight bit input port data bus 102 connected thereto. The remaining eight lines are configured as an output port which has an eight bit output port bus 103 connected thereto. The input bus 102 carries data bytes which originate ultimately from the readings of the temperature sensors 27 and 28, the moisture meter 61, and the status sensors 93. The output bus 103 carries commands and local addresses or selection signals for the proper routing of the commands to the grain dryer system equipment controlled by the computer 84.

The temperature sensors 27, and 28 if used, are preferably thermocouples such as type-J thermocouples, an industry standard name for a type of thermocouple constructed of iron and constantan, which is an alloy of nickel and copper. The thermocouples 27 and 28 are connected by respective relays 106 and 107 to a thermocouple amplifier 108. The amplifier 108 substitutes for the cold junctions normally a part of such thermocouple arrangements and provides calibration in cooperation with an analog to digital converter (ADC) 109 such that a given binary number output from the ADC 109 is interpreted as a corresponding temperature reading. The relays 106 and 107 are activated in alteration under control of the computer 84 so that only one thermocouple at a time is connected to the amplifier 108 for reading thereof. The ADC 109 is connected to the input bus 102 and is an eight bit converter such that 256 temperature levels can be represented by the output therefrom. The conversion process of the ADC occurs periodically and the converter can be read upon receiving a read command from the computer 84.

The moisture meter 61 may be any type of arrangement which is capable of measuring moisture content of the grain in relation to the dielectric constant thereof and which outputs a suitable binary indication of the measured moisture content. Alternatively, the meter 61 may output an analog signal which is converted to a digital signal for the computer 84. Details of the moisture meter 61 employed in the system 1 are not illustrated herein. Reference to portions of the previously mentioned U.S. Pat. No. 3,794,911 will provide more details of the type of moisture meter circuit employed.

The illustrated moisture meter 61 is a type which employs a reference oscillator and a variable frequency oscillator having connected in the frequency determining circuit thereof a moisture sensor which, in the system 1, is the sample cell 8. The difference between the frequencies of the two oscillators is counted by a digital counter, and the count is scaled to a moisture content percentage. The meter 61 also preferably employs temperature compensation circuitry including a grain sample temperature sensor, such as the thermistor 77, which adjusts the count in relation to the grain sample temperature.

The moisture meter 61 is activated by a moisture meter control relay 112 which is controlled by the computer 84. A temperature compensation relay 113 activates the temperature compensation circuitry of the meter 61. The binary output reading from the meter 61 is passed through a set of parallel buffers 114 and stored in a set of parallel latches 115 which are connected to the input data bus 102. The latches 115 are enabled as a group to receive the bits of the moisture meter output by a chip select line 116. The moisture meter reading stored in the latches 115 may be read by the computer 84 upon the reception by the latches 115 of a read enable signal on a read enable line 117. The chip select signal and read enable signal are received from the computer 84 over the output port bus 103.

The status switches 93 may function to monitor various conditions which need to be monitored to determine whether the system 1 is operating properly. One specific status sensor is a low grain sensor 120 which is positioned in the grain chamber 18 of the bin 2 to determine if more than a selected amount of grain is present in the chamber. If the sensor 120 indicates a low level of grain in the chamber 18, either the bin loading auger 31 can be activated to load more grain into the bin 2 or the process may be shut down because the current drying run is completed. The other status switches 93 may include, for example, a switch to determine whether or not the sample valve 55 has opened or closed when commanded by the computer 84 to do so. Other such status switches would occur to one skilled in the relevant art. The switch states which are provided by the status switches 93 and low grain sensor 120 are temporarily stored in a set of parallel latches 121 which are similar to the latches 115. The latches 121 are read from the input port bus 102 upon the reception of a read enable signal on a read enable line 122 which is connected to one of the lines of the output port bus 103. The latches 121 are enabled to record changes in state of the status switches 93 and 120 upon receiving a chip select signal on a chip select line 123.

Figure 6:
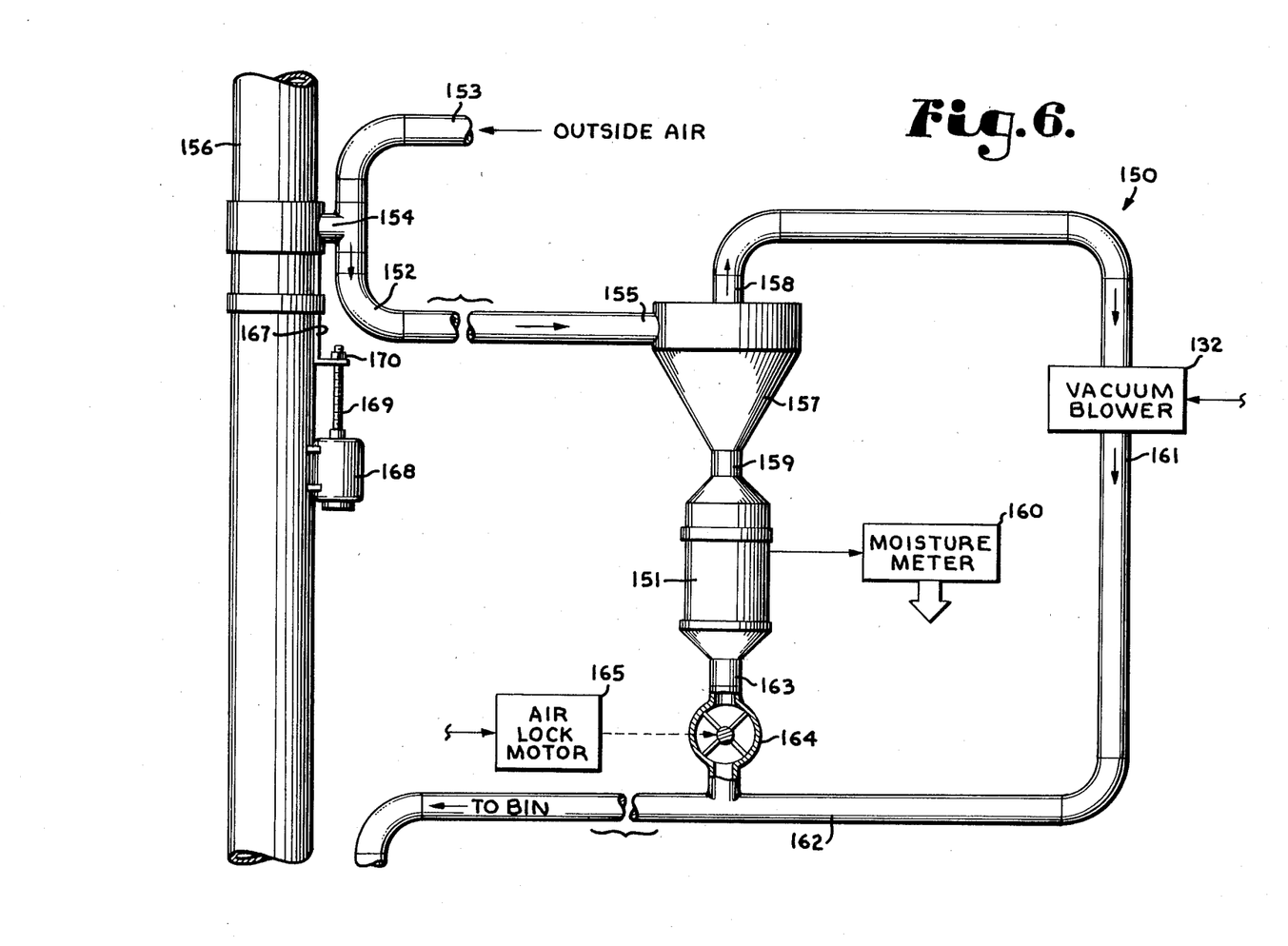
FIG. 6 is a diagramatic side elevational view of a vacuum blower arrangement for automatically loading grain into the sample cell of the present invention.

The functions of the system 1 which are controlled by the computer 84 include: the blower 22, the high fire valve 23, the low fire valve 24, the bin unloading auger motor 38, the sample valve motor 56, and the sample cell dump valve solenoid 76. The sample cell load valve motor 56 includes an open sample valve winding 125 and a reverse close sample valve winding 126. Each of these functions is controlled through the interface adapter 96 by way of the outpu bus 103, addressing circuitry which will be detailed below, and respective triacs 128. Further functions which are controlled by the computer 84 include various indicator lights 129 which are located on a console (not shown) of the computer system 6 and a sounder or buzzer 130. The indicator lights 129, only one of which is diagrammatically illustrated for simplicity, may correspond to any of the operating equipment and advise an operator of the activation of such equipment. The buzzer 130 alerts the operator to certain sensed conditions within the system 1, such as shutdown of the system 1 due to equipment malfunction. FIG. 5 shows the connection of a vacuum blower 132 which is employed in a modified embodiment of the grain sample system as is shown in FIG. 6. Additional unused control lines 133 provide for additional controlled functions as may be required in some embodiments of the system 1.

The manner of addressing the functions monitored and controlled by the I/O board 92 is substantially conventional. The interface adapter 96 is addressed by the computer 84 by an address decoder 135 of conventional design which is connected to the address bus 98 of the computer 84. Certain lines of the output port bus 103 are dedicated to local address codes, direct enable lines, and data lines. With eight bits available, 256 unique binary combinations can be outputted by the port connected to the bus 103. The addressing logic circuitry of the I/O board 92 is configured to correctly route the codes outputted by the interface adapter 96. The latches groups 115 and 121 and the ADC 109 are controlled by a decoder 137 which is a 4-to-16 line decoder. The four inputs of the decoder 137 are connected to four of the lines of the bus 103, and a chip enable terminal of the decoder 137 is connected to a direct enable line 138 of the bus 103. Two of the outputs of the decoder 137 are the chip enable lines 116 and 123 of the latch groups 115 and 121. Another output line of the decoder 137 is an ADC read enable line 139 which when activated causes the output of the ADC 109 to be placed on the input port bus 102 for reading by the computer 84. The remaining output lines of the decoder 137 are presently unused.

The functions controlled by the computer 84 are locally addressed by a pair of 3-to-8 line decoder latches or addressable octal latches 142 and 143. Each of the latches 142 and 143 is connected to three lines of the output bus 103 for addressing purposes and a single line for receiving data in the form of an ON or OFF command. Two additional lines of the bus 103 are decoded by decoder select logic circuits 144 and 145 respectively for the latches 142 and 143. Finally, a single line of the bus 103 is used to carry a reset command for the latches 142 and 143. The output lines of the latch 142 are connected to the relays 106, 107, 112, and 113 and through the triacs 128 to the auger motor 38 and the vacuum blower 132 if present. The output lines of the latch 142 are connected through triacs to the blower 22, the burner valves 23 and 24, the sample valve motor 56, the dump solenoid 76, and the lights and buzzer 129 and 130.

FIG. 6 illustrates a modified grain sample arrangement 150 which employs the vacuum blower 132 to urge grain into a sample cell 151 to determine the moisture content thereof. A grain sample conduit 152 has an airflow inlet 153, a grain inlet 154, and an outlet 155. The inlet 153 receives air preferably from a source outside of the grain drying bin to avoid the introduction of excess moisture from the drying bin. The grain inlet 154 communicates with the tube 156 of a center vertical unloading auger similar to the auger 33 of the bin 2. The airflow in the conduit 152 causes the induction of grain from the tube 156 such that the grain is entrained in the airflow. The outlet 155 of the conduit 152 is connected to an inlet of a separator 157 which is preferably a cyclone separator. The separator 157 has an airflow outlet 158 and a grain outlet 159. The airflow outlet 158 is connected to the vacuum blower 132 while the grain outlet 159 is connected to the sample chamber 151 which is substantially similar to the sample chamber 8. The separator 157 is of conventional design and is constructed internally to arrest the movement of the grain such that it may fall by gravity toward the outlet 159 and into the cell 151, while the airflow exits through the outlet 158. The sample cell 151 is connected to a digital moisture meter 160 similar to the moisture meter 61.

The vacuum blower 132 has an outlet 161 which communicates with a grain return conduit 162 such that the grain sample can be returned to the bin from which it was taken. The sample cell 151 has an outlet 163 which connects with the return conduit 162 through an airlock mechanism 164 which is driven by an airlock motor 165. The airlock 164 is a rotary mechanism which empties the sample cell 151 and prevents the introduction of pressurized air from the return conduit 162 into the cell 151 which would otherwise interfere with the emptying thereof. A sample valve gate 167 is positioned between the grain inlet 154 of the sample conduit 152 and an opening (not shown) in the auger tube 156. The sample valve 167 may be similar to the sample valve 55 of the sample system 5 and operates in a similar manner. A reversible rotary motor 168 has a threaded shaft 169 which engages a nut 170 affixed to the valve 167. The motor 168 may be connected to the I/O board 92 in place of the motor 56 and operated in a similar manner.

In operation of the vacuum grain sample arrangement 150, the vacuum blower 132 is activated to draw grain into the sample cell 151 through the separator 157 and then deactivated. There, the moisture content of the sample is measured by the moisture meter 160. After the measurement is made, the solenoid 166 and airlock motor 165 are activated and the vacuum blower 132 reactivated to empty the sample cell 151 and return the grain to the bin from which it was taken. The sample valve 167 is only open during the loading of the sample cell 151. The majority of the components of the sample arrangement 150 are positioned outside of the bin 2 from which the samples are taken and are suitably enclosed to protect them from the elements.

In general operation of the system 1, an operator turns on the computer 6 and sets the desired grain moisture content, the maximum plenum temperature, a blower start-up temperature for the plenum 17, and the current time. The system 1 is then controlled by the computer 6 to take an initial moisture reading by activating the unloading augers 3 and the sample valve 55 or 167 to cause the loading of the sample cell 8 or 151. While this is occurring, the burner is ignited, and the control system 6 is set to automatic operation. If the sample is wetter than desired, a waiting period is initiated in proportion to the difference between the measured moisture content and the desired moisture content. The heating unit 4 is cycled in such a manner as to dry the grain 7 most efficiently. If the initial cycle is as dry as or dryer than desired, the unloading augers 3 are activated to unload grain from the bin 2 and transfer it to as storage bin 10. In the automatic mode of operation, moisture readings are taken at selected intervals of time, and the heater unit 4 and augers 3 are automatically controlled in response to the moisture content and sensed temperatures. The system 1 will shut itself down upon the occurrence of predefined malfunctions and display diagnostic messages or print out such messages.

When the grain level sensor 120 senses that the bin 2 is empty, the system 1 will shut itself down and print a report of the operation.

In a preferred mode of operation, an initial moisture content reading is taken. If the reading is wetter than the desired moisture content, a wait period is initiated during which the heater unit 4 is cycled to maintain the start-up temperature. After the initial moisture content measurement, the subsequent moisture readings are averaged up to a selected maximum, for example, four readings including the current reading. After the first reading, as each reading is taken and determined to be wetter than desired, the controller 6 cycles the heater unit 4 to maintain an incrementally higher drying air temperature. As soon as either the current reading or the average moisture content is reduced to the desired moisture content, the unloading augers 3 are activated to remove grain from the bin 2.

Thereafter, the drying air temperature is adjusted, by cycling the heater unit 4 through the high and low fire valves 23 and 24, to accommodate variations in the moisture content of grain incoming into the bin 2. The controller 6, therefore, discerns a trend in the moisture content of the grain and adjusts the maintained drying air temperature in accordance with short term variations in the moisture content as measured. For example, if the average moisture content is as dry as desired, but the currently measured moisture content is too wet, the maintained drying air temperature is increased. Conversely, if either the average or current moisture content drops below the desired moisture percentage, the maintained air temperature is reduced to prevent overdrying. Before each increase in air temperature, the currently maintained drying air temperature is compared to the set maximum temperature to prevent "cooking" of the grain from excessive heat. The object is to adjust the drying air temperature in such a manner as to uniformly dry the grain while operating the unloading augers 3 as continuously as possible. This allows the drying process to proceed as rapidly as is possible commensurate with high uniformity of moisture content. The control method as described herein when operated with the apparatus described above retains the energy efficiency associated with batch dryers while operating at a greater throughput than can usually be achieved in such batch dryers.

The grain drying system 1 provides significant advantages over previously employed grain dryer systems. The drying operation is controlled in relation to directly measured grain moisture content rather than moisture content related to temperature measurements which is subject to a greater number of variables. Start up with the system 1 is faster for the operator since it is not necessary to wait for equilibrium conditions to be established as in systems in which control is based on temperature derived moisture content. The system 1 continuously adjusts the drying temperature for maximum drying rate and monitors the operation to prevent overdrying of the grain. Since the moisture content measurements are made periodically, variations in moisture of the grain within a bin can be compensated for as they are sensed such that greater uniformity of moisture content results. The monitoring and display of the status of the grain drying equipment speeds troubleshooting when malfunctions occur. The printing of records of the drying operations over a drying season facilitates planning and scheduling for the next season. Because the operation is closely monitored and controlled in response to monitored conditions, greater throughput and efficiency can be attained. Finally, the system 1 does not require a high degree of skill to operate and can run for the most part without human intervention.

The grain drying system 1 has been described in association with a particular configuration of apparatus including the bins 2 and 10, the grain sample withdrawal systems 5 and 150, and the capacitive moisture sensor cells 8 and 151. However, it is envisioned that other types of grain drying apparatus such as conventional continuous flow dryers would benefit from appropriate adaptations of the methods and apparatus according to the present invention. Further, it is foreseen that other types of non-manual moisture measuring devices such as moisture measurement probes and moisture measurement instruments based on infrared principles could be advantageously employed. Therefore, it is to be understood that while certain forms of the present invention have been illustrated and described herein, it is not to be limited to the specific forms or arrangement of parts described and shown.

What is claimed and desired to be secured by Letters Patent is as follows:

1. A method of drying grain comprising the steps of:
   (a) providing a grain drying apparatus including grain dryer chamber means for holding grain, grain conveyor means to urge grain into and out of said chamber means, a heater unit to communicate heated air to said chamber means to dry said grain, grain moisture meter means for measuring the moisture content of said grain, and dryer control means having said grain conveyor means, said heater unit, and said moisture meter means interconnected thereto;
   (b) conveying grain into said chamber means;
   (c) communicating heated air to said chamber means to dry said grain;
   (d) periodically directly measuring the moisture content of said grain from a drying zone near whereat said heated air first communicate with said grain such that the mosisture content of the grain from near the inlet of the heated air is measured and generating a grain moisture signal representative of the moisture content of said grain by said moisture meter means;
   (e) communicating said grain moisture signal to said control means; and
   (f) controlling the operation of said heater unit by said dryer control means in response to the moisture content represented by said grain moisutre signal and controlling the operation of said conveyor means to withdraw grain from said drying zone in response to said grain moisture content being near a preselected level.

2. A method as set forth in claim 1 wherein said measuring the moisture content step includes:
   (a) measuring the dielectric constant of said grain; and
   (b) converting the measured dielectric constant of said grain to a moisture content precentage of said grain.

3. A method as set forth in claim 1 including:
   (a) mechanically withdrawing a grain sample of grain in said chamber means;
   (b) measuring the moisture content of said grain sample; and
   (c) generating said moisture signal which represents the moisture content of said grain sample.

4. A method as set forth in claim 3 including the steps of:
  (a) establishing a grain withdrawal airflow between said grain chamber means and said moisture meter means;
  (b) entraining said grain sample in said withdrawal airflow;
  (c) separating said grain sample from said withdrawal airflow;
  (d) depositing the separated grain sample in said moisture meter means;
  (e) entraining said grain sample in a return airflow after measuring the moisture content thereof; and
  (f) returning said grain sample to said grain chamber means.

5. A method as set forth in claim 1 including the steps of:
  (a) entering a desired grain moisture content into said control means;
  (b) entering a desired drying air temperature into said control means;
  (c) controlling the operation of said heater unit by said control means to normally maintain said desired drying air temperature; and
  (d) upon said moisture signal representing a moisture content which is not greater than said desired moisture content, controlling said conveyor means by said control means to unload grain from said chamber means.

6. In a method of drying grain in a grain dryer apparatus including grain dryer chamber means for holding grain, grain conveyor means to urge grain into and out of said chamber means, a heater unit to communicate heated air to said chamber means to dry said grain, grain moisture meter means for measuring moisture content of said grain, and dryer control means having said grain conveyor means, said heater unit, and said moisture meter means interconnected thereto; said method including conveying grain into said chamber means and communicating heated air thereto to dry said grain; the improvement comprising the steps of:
  (a) periodically measuring, by said grain moisture meter means, the moisture content of the grain in close proximity to the location whereat the heated air first communicate with the grain;
  (b) generating a grain moisture signal representative of the moisture content of said grain in close proximity to the location whereat the heated air first communicates with the grain by said moisture meter means;
  (c) communicating said grain moisture signal to said control means; and
  (d) controlling the operation of said grain conveyor means by said control means in response to the moisture content represented by said grain moisture signal such that grain dried near a preselected moisture content is conveyed away from said location whereat the heated air first communicates with the grain.

7. In a method for drying a free flowing grain in a bin having a ventilated floor, conveyor means for moving a lower portion of grain from the bin floor to a grain storage bin, and means for supplying heated air upwardly through the ventilated floor, the improvement comprising the steps of:
  (a) utilizing said conveyor means to remove grain from said bin floor near whereat said heated air is supplied through said floor into said grain and removing at predetermined time intervals a portion of grain from said conveyor means downstream from the drying bin;
  (b) delivering the grain portion into an upright elongated tubular cell means having a grain moisture testing zone intermediate the ends thereof;
  (c) generating a grain moisture content electrical signal representative of the moisture content of the volume of grain in the moisture testing zone; and then
  (d) controlling the operation of said conveyor means and heated air supply means in response to the generated grain moisture content signal such that said heated air dries said grain to near a preselected moisture content and such that said conveyor means conveys grain having a moisture content near said preselected moisture content away from near said floor.

8. In a method for drying a free flowing grain in a drying bin having a ventilated floor, conveyor means for moving a lower portion of grain from the bin floor to a grain storage bin, and means for supplying heated air upwardly through the ventilated floor, the improvement comprising the steps of:
  (a) forming an upright grain moisture meter cell means with an outer wall having non-conductive end portions and an intermediate conductive portion;
  (b) locating a conductive core centrally within the intermediate conductive portion;
  (c) removing at predetermined time intervals a sample of grain from the drying bin in close proximity to the bin floor whereat said heated air is first communicated with the grain by said conveyor means;
  (d) delivering the grain sample into said cell means;
  (e) generating a grain moisture content signal representative of the direct moisture content of the volume of grain between the central core and the intermediate outer wall portion; and then
  (f) controlling said conveyor means so as to remove grain from near said bin floor when the moisture content of the grain near the bin floor is at or below a preselected moisture level and controlling heated air supply means in response to the generated grain moisture content signal such that said grain becomes dried to near said preselected moisture content.

9. A method of drying grain comprising the steps of:
  (a) providing a grain drying bin, bin loading means, and bin unloading means;
  (b) loading a quantity of grain into said bin;
  (c) communicating heated air to said bin to dry the grain therein;
  (d) periodically, mechanically withdrawing a grain sample from the grain in said bin near whereat said heated air is communicated with said grain;
  (e) measuring the moisture content of said grain sample;
  (f) generating a grain moisture signal representative of the measured moisture content of said grain sample;
  (g) communicating said grain moisture signal to said bin unloading means; and
  (h) activating said unloading means to unload grain from said bin in response to a selected grain moisture content represented by said grain moisture signal.

10. A method as set forth in claim 9 including the steps of:
(a) communicating said heated air to a drying zone of said grain in said bin;
(b) unloading grain from said drying zone upon the activation of said unloading means; and
(c) withdrawing said grain sample from grain within said unloading means.

11. A method as set forth in claim 10 wherein said unloading means includes an unloading auger within an unloading auger tube and said withdrawing step includes the steps of:
(a) activating said unloading auger long enough to substantially fill said unloading auger tube;
(b) entraining grain from said auger tube in an airflow of air from outside of said bin;
(c) separating said grain from said airflow in separator means;
(d) filling a moisture meter sample cell with a grain sample of grain from said separator means;
(e) measuring the moisture content of said grain sample in said sample cell;
(f) re-entraining said grain sample in an airflow; and
(g) returning said grain sample to said bin.

12. A method as set forth in claim 11 wherein said generating said moisture signal includes the step of:
(a) generating a moisture signal having a property which is related to the dielectric constant of said grain sample, said dielectric constant being related to the moisture content of said grain sample.

13. A grain drying system comprising:
(a) a grain drying chamber means adapted for holding a quantity of grain to be dried;
(b) grain drying means operable to communicate heated air to grain in said chamber means to dry said grain;
(c) grain moisture measuring means operative to withdraw a grain sample of said grain in said chamber means from close proximity to the location whereat said heated air is communicated to said grain and measure the moisture content of said grain sample;
(d) grain chamber unloading means operable to transfer dried grain from said chamber means; and
(e) a digital computer means having said grain drying means, said grain moisture measuring means, and said chamber unloading means interfaced thereto, said computer means controlling the withdrawal of grain samples and the measurement of the moisture content thereof and controlling said drying means and said unloading means by activating said unloading means to withdraw grain from close proximity to the location whereat said heated air is communicated with said grain in response to the measured moisture content of said grain samples so as to control the moisture content in the grain transferred by said unloading means.

14. A system as set forth in claim 13 wherein:
(a) said drying means dries said grain in said chamber means in a drying zone thereof;
(b) said unloading means transfers grain from said drying zone;
(c) said moisture measuring means communicates with said unloading means and receives said grain sample from said unloading means.

15. A system as set forth in claim 13 wherein said moisture measuring means includes:

(a) a grain sample cell for receiving said grain samples, said sample cell being an electrical capacitor; and
(b) a moisture meter connected to said sample cell and operative to provide a moisture signal having a property which is related to the dielectric constant of said grain sample in said cell.

16. A system as set forth in claim 15 wherein said sample cell includes:
(a) a cylindrical conductive outer electrode having opposite ends, said outer electrode having an axis which is positioned vertically;
(b) a cyindrical conductive inner electrode having opposite ends and positioned coaxially within said outer electrode with the ends of said inner electrode in vertically spaced relation to the ends of said outer electrode to define an annular active region of said sample cell;
(c) cylindrical nonconductive wall means extending above said outer electrode and said active region of said sample cell at least to a distance such that when said sample cell is filled, the grain sample therein extends beyond electric field fringe regions at the ends of said inner and outer electrodes; and
(d) sample cell closure means positioned at a lower end of said sample cell and including closure motor means interconnected with said computer means whereby said closure means is closed to allow the filling of said sample cell with grain to beyond said fringe regions and is opened to empty said grain sample from said cell.

17. A system as set forth in claim 13 wherein said moisture measuring means includes:
(a) a grain sample cell to receive and hold said grain sample for the measurement of the moisture content thereof;
(b) a grain sample conduit extending between said chamber unloading means and said grain sample cell and transferring grain from said chamber unloading means to said grain sample cell; and
(c) a grain sample valve positioned between said grain unloading means and said grain sample conduit and including a sample valve motor interconnected with said computer means, said sample valve motor being controlled by said computer means to cause the opening of said sample valve to load grain into said grain sample cell and to cause the closing of said sample valve thereafter.

18. A system as set forth in claim 17 wherein said grain moisture measuring means includes:
(a) blower means generating an airflow to urge grain in said grain sample conduit toward said sample cell, said blower means being interconnected with said computer means;
(b) grain separator means between said grain sample conduit and said sample cell to separate said grain sample from said airflow; and
(c) a grain return conduit communicating with said sample cell and said blower means to receive said grain sample and return same to said chamber means after the measurement of the moisture content of said grain sample.

19. A system as set forth in claim 18 including:
(a) sample cell closure means positioned between said sample cell and said return conduit to prevent the flow of air from said return conduit into said sample cell during the loading of said grain sample into said cell and the emptying of said grain sample therefrom.

20. A system as set forth in claim 17 including:
(a) grain separator means having an inlet, an airflow outlet, and a grain outlet; said separator means receiving grain entrained in an airflow and separating said grain from said airflow; said grain outlet communicating grain to said grain sample cell;
(b) said grain sample conduit having an airflow inlet, a grain inlet, and a conduit outlet; said grain inlet communicating with said chamber unloading means and being positioned between said airflow inlet and said conduit outlet;
(c) a grain return conduit communicating with said grain sample cell to receive said grain sample therefrom and return same to said grain chamber means;
(d) sample cell closure means positioned between said sample cell and said return conduit to selectively retain said grain sample in said sample cell and allow the emptying of said grain sample from said sample cell; and
(e) a vacuum blower interconnected with said computer means and communicating with said airflow outlet of said separator means and said grain return conduit; said blower drawing air into said sample conduit airflow inlet and past said grain inlet thereby entraining grain in the airflow in said sample conduit; said blower drawing the grain entrained airflow into said inlet of said separator means and drawing said airflow without said grain out of said separator mean through said airflow outlet; and said blower urging grain in said return conduit from said sample cell through said return conduit and back to said grain drying chamber means.

21. A system as set forth in claim 20 wherein:
(a) said airflow inlet of said grain sample conduit is positioned to receive air from outside of said grain drying chamber means.

22. A system as set forth in claim 20 wherein said sample cell closure means includes:
(a) airlock means positioned between said grain sample cell and said grain return conduit to prevent the introduction of airflow from said return conduit into said sample cell.

23. A system as set forth in claim 13 including: (a) a grain temperature sensor positioned in said grain drying chamber means for contact with said grain being dried; said grain temperature sensor being interconnected with said computer means whereby said computer means controls said grain drying means in response to the temperature sensed by said grain temperature sensor.

24. A system as set forth in claim 13 wherein:
(a) said grain drying chamber means includes a lower air distribution plenum, an upper grain chamber, and a perforated grain chamber floor separating said plenum from said grain chamber and supporting grain in said grain chamber;
(b) said grain drying means includes a burner, burner valve means, and a blower; and
(c) said burner valve means and said blower are interconnected with said computer means for the activation of said burner and said blower to propel heated air into said plenum and through said perforated floor into said grain chamber to dry said grain.

25. A system as set forth in claim 24 including:
(a) a plenum temperature sensor positioned in said plenum to measure the temperature of air in said plenum; and
(b) said plenum temperature sensor being interconnected to said computer means for the control of said grain drying means in response to the temperature sensed by said temperature sensor.

26. A system as set forth in claim 13 wherein said grain drying chamber means includes:
(a) grain chamber loading means which when activated loads grain into said chamber means to dry said grain; and
(b) a low grain sensor positioned in said chamber means for engagement by grain therein when more than a selected amount of grain is present in said chamber means and which is interconnected with said computer means to cause one of:
(1) the activation of said chamber loading means in response to the sensing of less than said selected amount of grain by said low grain sensor; and
(2) the deactivation of said grain drying system.

27. In a grain drying system including a grain drying chamber means for holding a quantity of grain to be dried, grain drying means for communicating heated air to said chamber means to dry said grain, and grain chamber unloading means for transferring dried grain from said chamber means, the improvement comprising:
(a) a capacitive grain sample cell for holding a grain sample;
(b) chamber unloading means for unloding grain from said chamber means near whereat heated air is first directly communicated to said grain and grain sample means communicating with said chamber unloading means for withdrawing said grain sample from said chamber unloading means and transferring said grain sample to said sample cell;
(c) grain moisture meter means connected to said sample cell for generating a grain moisture signal representative of the moisture content of said grain sample from near whereat heated air is communicated to said grain, said grain moisture signal being related to the dielectric constant of said grain sample; and
(d) digital computer means having said grain drying means, said grain moisture meter means, and said chamber unloading means interfaced thereto; said computer means controlling the withdrawal of grain samples, the measurement of the moisture content thereof, and controlling said drying means and said unloading means in response to the moisture signals respectively of said grain samples such that said grain is unloaded from said chamber and taken out of direct communication with said heated air when said grain approaches a desired predetermined moisture content.

28. A grain drying system comprising:
(a) a grain drying bin for holding a quantity of grain to be dried;
(b) grain drying means for communicating heated air to said bin to dry said grain;
(c) bin unloading means for transferring dried grain from near the location whereat said heated air is first communicated with said grain in said bin;
(d) a capacitive grain sample cell for holding a grain sample and including:

(1) a cylindrical conductive outer electrode heated opposite ends, said outer electrode having an axis which is positioned vertically;

(2) a cylindrical conductive inner electrode having opposite ends and positioned coaxially within said outer electrode with the ends of said inner electrode in vertically spaced relation to the ends of said outer electrode to define an annular active region of said sample chamber;

(3) cylindrical nonconductive wall means extending beyond the ends of said outer electrode beyond the ends of said outer electrode and said active region of said sample cell at least to a distance such that when said sample cell is filled, the grain sample therein extends beyond electric field fringe regions at the ends of said inner and outer electrodes; and (4) a sample cell dump valve positioned at a lower end of said sample cell and including a valve motor for closing said sample dump valve to allow the filling of said sample cell with grain and for opening said dump valve to empty said grain sample from said sample cell;

(e) grain sample means communicating with said bin unloading means for withdrawing said grain sample from near whereat heated air is first communicated to said grain from said bin unloading means and transferring said grain sample to said sample cell;

(f) a grain moisture meter connected to said sample cell for generating a grain moisture signal representative of the moisture content within the kernals of said grain sample, said grain moisture signal being related to the dielectric constant of said grain sample; and (g) digital computer means having said grain drying means, said grain moisture meter, said bin unloading means, and said valve motor interfaced thereto; said computer means controlling the withdrawal of grain samples and the measurement of the grain moisture content thereof and controlling said drying means and said unloading mens in response to the moisture signals respectively of said grain samples such that said grain is unloaded from said bin from near whereat heated air is communicated to said grain thereat becomes near a preselected moisture content.

29. A method of drying grain comprising the steps of:
(a) providing a grain drying apparatus including grain dryer chamber means for holding grain, grain conveyor means to urge grain into and out of said chamber means, a heater unit to communicate heated air to said chamber means to dry said grain, moisture meter means for measuring the moisture content of said grain, and dryer control means having said grain conveyor means, said heater unit, and said moisture meter means interconnected thereto;
(b) conveying grain into said chamber means;
(c) communicating heated air to said chamber means to dry said grain;
(d) periodically measuring the moisture content of said grain being dried and generating a moisture signal representative of the moisture content of said grain by said moisture meter means;
(e) communicating said moisture signal to said control means;
(f) controlling the operation of at least one of said heater unit and said grain conveyor means by said dryer control means in response to the moisture content represented by said moisture signal;
(g) entering a desired grain moisture content into said control means;
(h) entering a desired drying air temperature into said control means;
(i) controlling the operation of said heater unit by said control means to normally maintain said desired drying air temperature;
(j) upon said moisture signal representing a moisture content which is not greater than said desired moisture content, controlling said conveyor means by said control means to unload grain from said chamber means; and
(k) upon said moisture signal representing a moisture content which is drier than said desired moisture content by a selected moisture content percentage increment, controlling said heater unit by said control means to maintain a drying air temperature which is coller than said desired air temperature by a selected temperature increment.

30. A method of drying grain comprising the steps of:
(a) providing a grain drying apparatus including grain dryer chamber means for holding grain, grain conveyor means to urge grain into and out of said chamber means, a heater unit to communicate heated air to said chamber means to dry said grain, moisture meter means for measuring the moisture content of said grain, and dryer control means having said grain conveyor means, said heater unit, and said moisture meter means interconnected thereto;
(b) conveying grain into said chamber means;
(c) communicating heated air to said chamber means to dry said grain;
(d) periodically measuring the moisture content of said grain being dried and generating a moisture signal representative of the moisture content of said grain by said moisture meter means;
(e) communicating said moisture signal to said control means;
(f) controlling the operation of at least one of said heater unit and said grain conveyor means by said dryer control means in response to the moisture content represented by said moisture signal;
(g) entering a desired grain moisture content into said control means;
(h) entering a desire drying air temperature into said control means;
(i) controlling the operation of said heater unit by said control means to normally maintain said desired drying air temperature;
(j) upon said moisture signal representing a moisture content which is not greater than said desired moisture content, controlling said conveyor means by said control means to unload grain from said chamber means;
(k) averaging, by said control means, each moisture content reading with a selected number of previous moisture content readings resulting in an average moisture content; and
(l) upon said moisture signal representing a moisture content wetter than said desired moisture content and the current average moisture content being not greater than said desired moisture content, controlling said heater unit by said control means to maintain a drying air temperature which is warmer than said desired drying air temperature by a selected temperature increment.

* * * * *